United States Patent
Kokubo (10) Patent No.: US 7,021,725 B2
(45) Date of Patent: Apr. 4, 2006

(54) PUMP DRIVE MOTOR CONTROL APPARATUS

(75) Inventor: Koichi Kokubo, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/847,575

(22) Filed: May 18, 2004

(65) Prior Publication Data

US 2004/0239174 A1    Dec. 2, 2004

(30) Foreign Application Priority Data

Jun. 2, 2003    (JP)    ............... 2003-156436

(51) Int. Cl.
*B60T 8/42*    (2006.01)
(52) U.S. Cl. .................. 303/115.5; 303/3; 303/11; 303/20
(58) Field of Classification Search ............ 303/10 X, 303/11 X, 3 X, 13, 15, 113.1, 20 X, 115.4 X, 303/115.5 O, 116.1; 701/70, 71
See application file for complete search history.

(56) References Cited

U.S. PATENT DOCUMENTS

| | | |
|---|---|---|
| 5,704,766 A | 1/1998 | Fennel et al. |
| 6,135,577 A * | 10/2000 | Ishii ........................... 303/10 |
| 6,299,260 B1 * | 10/2001 | Hachtel ...................... 303/10 |
| 6,499,813 B1 | 12/2002 | Wandel |
| 6,709,067 B1 * | 3/2004 | Schmitt et al. ............... 303/11 |

FOREIGN PATENT DOCUMENTS

| | | |
|---|---|---|
| JP | 8-501614 | 2/1996 |
| JP | 2000-313325 | 11/2000 |
| JP | 2002-506406 | 2/2002 |
| WO | WO 99/55566 | 11/1999 |

* cited by examiner

*Primary Examiner*—Melanie Torres
(74) *Attorney, Agent, or Firm*—Buchanan Ingersoll PC (57) ABSTRACT

A pump drive motor control apparatus is applied to a motor for driving a hydraulic pump which supplies to a hydraulic circuit the brake fluid returned to a reservoir as a result of ABS control. When a motor inter-terminal voltage becomes equal to or less than a voltage threshold in a period during which a motor control signal is at a low level (supply of electricity to the motor is stopped), the control apparatus changes the motor control signal to a high level (resumes the supply of electricity) for a predetermined time, to thereby control the rotational speed of the motor. When the cause of the start of ABS control is not a demand for excessively abrupt braking, the voltage threshold is lowered to reduce the rotational speed of the motor during a predetermined period of time immediately after the start of ABS control.

11 Claims, 8 Drawing Sheets

TIME ELAPSED AFTER START OF
ABS CONTROL

PUMP DRIVE MOTOR CONTROL APPARATUS

BACKGROUND OF THE INVENTION

1. Field of the Invention

The present invention relates to a pump drive motor control apparatus for controlling the rotational speed of a motor for driving a pump, and more particularly to a pump drive motor control apparatus which controls the rotational speed of a motor through on-off control performed such that supply of electricity to the motor is resumed on the basis of a result of comparison between a predetermined threshold and a voltage which the motor generates during a period in which supply of electricity to the motor is stopped.

2. Description of the Related Art

A conventional pump drive motor control apparatus of such a type is disclosed in, for example, Japanese kohyo (PCT) Patent Publication No. 2002-506406. The disclosed control apparatus is applied to a motor for driving a hydraulic pump which is used in an antilock brake system in order to pump brake fluid returned to a reservoir as a result of operation of the antilock brake system and to supply the pumped brake fluid to a hydraulic circuit of the antilock brake system. The control apparatus controls the rotational speed of the motor through on-off control performed such that supply of electricity to the motor is resumed when a voltage which the motor generates during a period in which supply of electricity to the motor is stopped (i.e., an induced electromotive force which the motor generates as a result of acting as a generator) becomes equal to or less than a predetermined threshold.

If the reservoir, to which brake fluid is returned as a result of operation of the antilock brake system, is filled with brake fluid, further return of brake fluid from the hydraulic circuit of the antilock brake system to the reservoir becomes impossible, resulting in failure of the antilock brake system to attain brake fluid pressure control (hereinafter, referred to as "ABS control"). Accordingly, brake fluid must be pumped out of the reservoir in order to prevent the brake fluid from filling the reservoir.

The time-average of flow rate at which the hydraulic pump pumps brake fluid out of the reservoir and discharges (hereinafter, may be simply referred to as "discharge flow rate") increases with the time-average of rotational speed of a motor for driving the hydraulic pump (hereinafter, may be simply referred to as "rotational speed of the motor"). Further, the rotational speed of the motor increases as the predetermined threshold increases. However, in the disclosed apparatus, since the predetermined threshold is fixed, the rotational speed of the motor cannot be changed.

Moreover, the time average of quantity of brake fluid returned to the reservoir per unit time (hereinafter, may be simply referred to as "flow rate of brake fluid") also varies in accordance with the operation conditions of the antilock brake system. Accordingly, in order to avoid failure of the ABS control in the disclosed apparatus, the rotational speed (constant value) of the motor is preferably set to a high level such that the pump can pump brake fluid from the reservoir at a flow rate corresponding to the expected maximum flow rate of brake fluid returned to the reservoir.

Meanwhile, a hydraulic pump and a motor as described above are required to reduce their operation sound (or noise) to the extent possible. The lower the rotational speed of the motor, the smaller the operation sound. In view of this, the rotational speed of the motor is strongly desired to be lowered to the extent possible.

Results of analysis of actual operation conditions of an antilock brake system revealed that in many cases, the flow rate of brake fluid returned to the reservoir is relatively low during a short period of time immediately after the start of ABS control. This will be described below.

In general, cases where ABS control is started can be classified into a case where an excessively abrupt braking operation is applied to the brake pedal when an emergency arises (hereinafter referred to as a "case where excessively abrupt braking is demanded"), and a case in which a driver his/herself controls the brake pedal depressing force (hereinafter simply referred to as "depressing force") in such a manner that the actual deceleration of the vehicle body approaches the maximum attainable deceleration of the vehicle as determined by the friction coefficient of road surface (hereinafter referred to as a "case where depressing force control is performed"). Of these, the case where depressing force control is performed occurs more frequently.

In the case where the depressing force control is performed, since the driver controls the brake pedal depressing force, even when ABS control is started in response to locking of a wheel, the ABS control (temporarily) ends when the driver immediately decreases the brake pedal depressing force. In other words, in many cases, ABS control ends within a short period of time. Moreover, in such a short period of time, in many cases the difference between the pressure (i.e., master cylinder fluid pressure) generated within the antilock brake system in accordance with the brake pedal depressing force and the fluid pressure of the wheel cylinder on the locked wheel subjected to the ABS control is maintained relatively small. In general, the flow rate of brake fluid returned to the reservoir tends to decreases with the pressure difference. Accordingly, in the above-described short period of time, in many cases the flow rate of brake fluid returned to the reservoir becomes relatively low.

As is understood from the above, during a short period of time immediately after the start of ABS control, even when the rotational speed of the motor is set to a relatively low level, failure of the ABS control hardly occurs. Accordingly, during such a short period of time, it is advantageous to set the rotational speed of the motor to a low level with higher priority placed on reduction of operation sound over reliable avoidance of failure of ABS control. In other words, reducing the operation sound of the motor (pump) during a short period of time immediately after the start of motor speed control is preferred.

SUMMARY OF THE INVENTION

An object of the present invention is to provide a pump drive motor control apparatus for controlling the rotational speed of a motor for driving a pump, which apparatus can reduce operation sound of the motor during a short period of time immediately after the start of rotational speed control for the motor.

In order to achieve the above object, the present invention provides a pump drive motor control apparatus for controlling a motor for driving a pump, comprising: control means for controlling rotational speed of the motor through on-off control performed such that supply of electricity to the motor is resumed on the basis of a result of comparison between a predetermined threshold and a voltage which the motor generates in a state in which supply of electricity to the motor is stopped; and threshold setting means for setting the threshold to a first value during a period before elapse of a predetermined period of time after the rotational speed control for the motor has been started by the control means, and for setting the threshold to a second value greater than the first value after elapse of the predetermined period of time. The control means is preferably configured to resume supply of electricity to the motor when the voltage which the motor generates in a state in which supply of electricity to the motor is stopped (i.e., an induced electromotive force generated as a result of the motor serving as a generator) becomes equal to or less than the threshold.

By virtue of the above configuration, during a period before elapse of a predetermined period of time after the rotational speed control for the motor has been started, the rotational speed of the motor is set lower than that after elapse of the predetermined period of time. Accordingly, the operation sound of the motor can be lowered in a short period of time immediately after the start of rotational speed control for the motor.

In this case, preferably, the pump driven by the motor is a hydraulic pump used in a brake fluid pressure controller of a vehicle including at least an antilock brake system, the hydraulic pump pumping brake fluid returned to a reservoir as a result of operation of the brake fluid pressure controller and supplying the pumped brake fluid to a hydraulic circuit of the brake fluid pressure controller; and the control means controls the rotational speed of the motor at least during a period in which the brake fluid pressure controller is operating.

Preferably, the control means is configured to start the rotational speed control for the motor simultaneously with the start of operation of the brake fluid pressure controller (start of ABS control). Further, in the case where the depressing force control is performed, the predetermined period of time is preferably set to a short time such that ABS control can continue.

By virtue of this configuration, at least when the case where ABS control is started is the case where depressing force control is performed, the case occurring with high frequency, operation sound of the motor during a short period of time immediately after the start of ABS control can be reduced, while failure of ABS control is avoided.

In the case where the pump drive motor control apparatus of the present invention comprises determination means for determining whether a specific operation for demanding excessively abrupt brake is applied to a brake operation member (e.g., a brake pedal) for causing the brake fluid pressure controller to generate brake fluid pressure (i.e., whether the present case is the case in which excessively abrupt braking is demanded), the threshold setting means is configured such that when the specific operation is determined to have been performed, the threshold is set to a third value, instead of the first or second value, after the start of rotational speed control for the motor, the third value being greater than the first value. The third value may be equal to the second value.

In the case where excessively abrupt braking is demanded, in general, a driver tends to operate the brake pedal quickly and strongly. Accordingly, unlike the case where the depressing force control is performed, a relatively large difference is often produced between the master cylinder fluid pressure and the fluid pressure of the wheel cylinder on a wheel subjected to ABS control. In other words, in many cases, the flow rate of brake fluid returned to the reservoir increases to a relatively high level immediately after the start of ABS control, with a resultant increase in the possibility that failure of ABS control occurs in a relatively early stage immediately after the start of ABS control.

Accordingly, as described above, when the specific operation is determined to have been performed (i.e., the case where excessively abrupt braking is demanded), the threshold is set to, instead of the first or second value, the third value greater than the first value, after the start of rotational speed control for the motor. By virtue of this operation, the rotational speed of the motor can be set to a relatively high level immediately after the start of ABS control, whereby higher priority can be placed on avoidance of failure of ABS control over reduction of operation sound of the motor.

Notably, in the case where the pump drive motor control apparatus of the present invention comprises the determination means for determining whether the specific operation is performed, the threshold setting means may be configured such that only when the specific operation is determined not to have been performed, the threshold is set to the first value during a period before elapse of the predetermined period of time after the start of the rotational speed control, and is set to the second value after elapse of the predetermined period of time.

Preferably, the determination means comprises brake fluid pressure acquisition means for acquiring brake fluid pressure which is generated within the brake fluid pressure controller in accordance with the operating force applied to the brake operating member (i.e., master cylinder pressure); and the determination as to whether the specific operation has been performed is made on the basis of the acquired brake fluid pressure. The brake fluid pressure acquisition means may be means for acquiring brake fluid pressure through physical detection thereof, such as a pressure sensor, or means for acquiring brake fluid pressure through estimation on the basis of a predetermined calculation.

As described previously, in the case where excessively abrupt braking is demanded, in general, a driver tends to operate the brake pedal quickly and strongly. Accordingly, in such a case, the value of the brake fluid pressure (master cylinder pressure) and a value obtained through differentiation of the brake fluid pressure with respect to time tend to assume large values. Accordingly, when the determination as to whether the specific operation has been performed is made on the basis of the acquired brake fluid pressure, the determination as to whether the cause of the start of ABS control is a demand for excessively abrupt braking can be made by use of a simple configuration.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
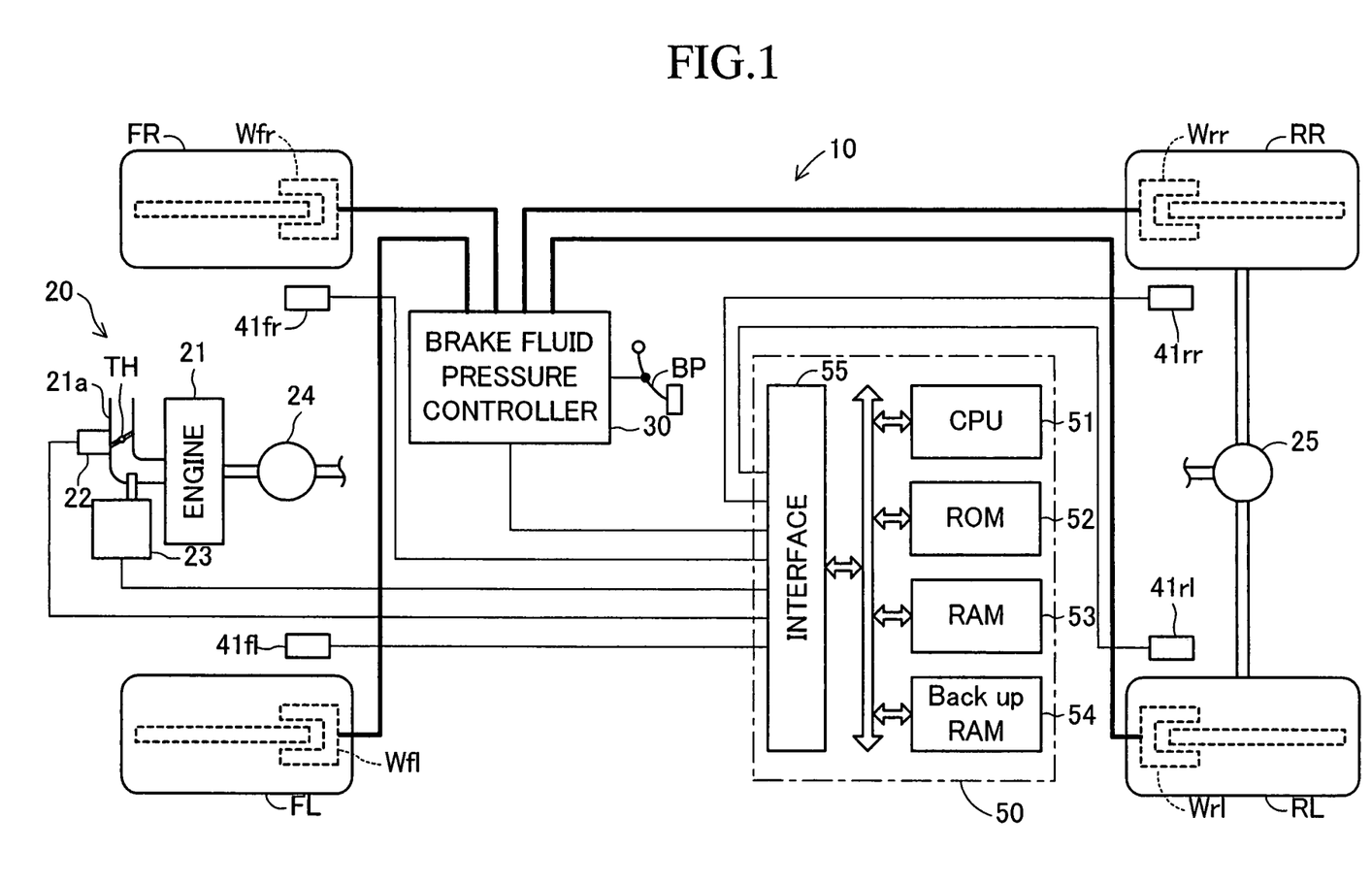
FIG. 1 is a schematic diagram of a vehicle equipped with a vehicle control apparatus including a pump drive motor control apparatus according to an embodiment of the present invention.

An embodiment of a pump drive motor control apparatus according to the present invention will be described with reference to the drawings. FIG. 1 schematically shows the structure of a vehicle equipped with a vehicle control apparatus 10 including a pump drive motor control apparatus according to the embodiment of the present invention. The illustrated vehicle is a four-wheel, rear-wheel drive (FR) vehicle having two front wheels (a front left wheel FL and a front right wheel FR) which are non-drive wheels (follower wheels), and two rear wheels (a rear left wheel RL and a rear right wheel RR) which are drive wheels.

This vehicle control apparatus 10 has a drive force transmission mechanism 20 which generates a drive force and transmits it to the drive wheels RL and RR; and a brake fluid pressure controller 30 for generating a braking force in each wheel by means of brake fluid pressure.

The drive force transmission mechanism 20 comprises an engine 21 which generates a drive force, a throttle valve actuator 22 comprising a DC motor which controls the opening of a throttle valve TH which is disposed in an intake pipe 21 a of the engine 21 and which varies the open cross-sectional area of the intake passage; a fuel injection apparatus 23 which includes fuel injectors which inject fuel in the vicinity of unillustrated intake ports of the engine 21; a transmission 24 having an input shaft connected to an output shaft of the engine 21, and a differential gear 25 which distributes between the rear wheels RR and RL the drive force which is transmitted from an output shaft of the transmission 24.

Figure 2:
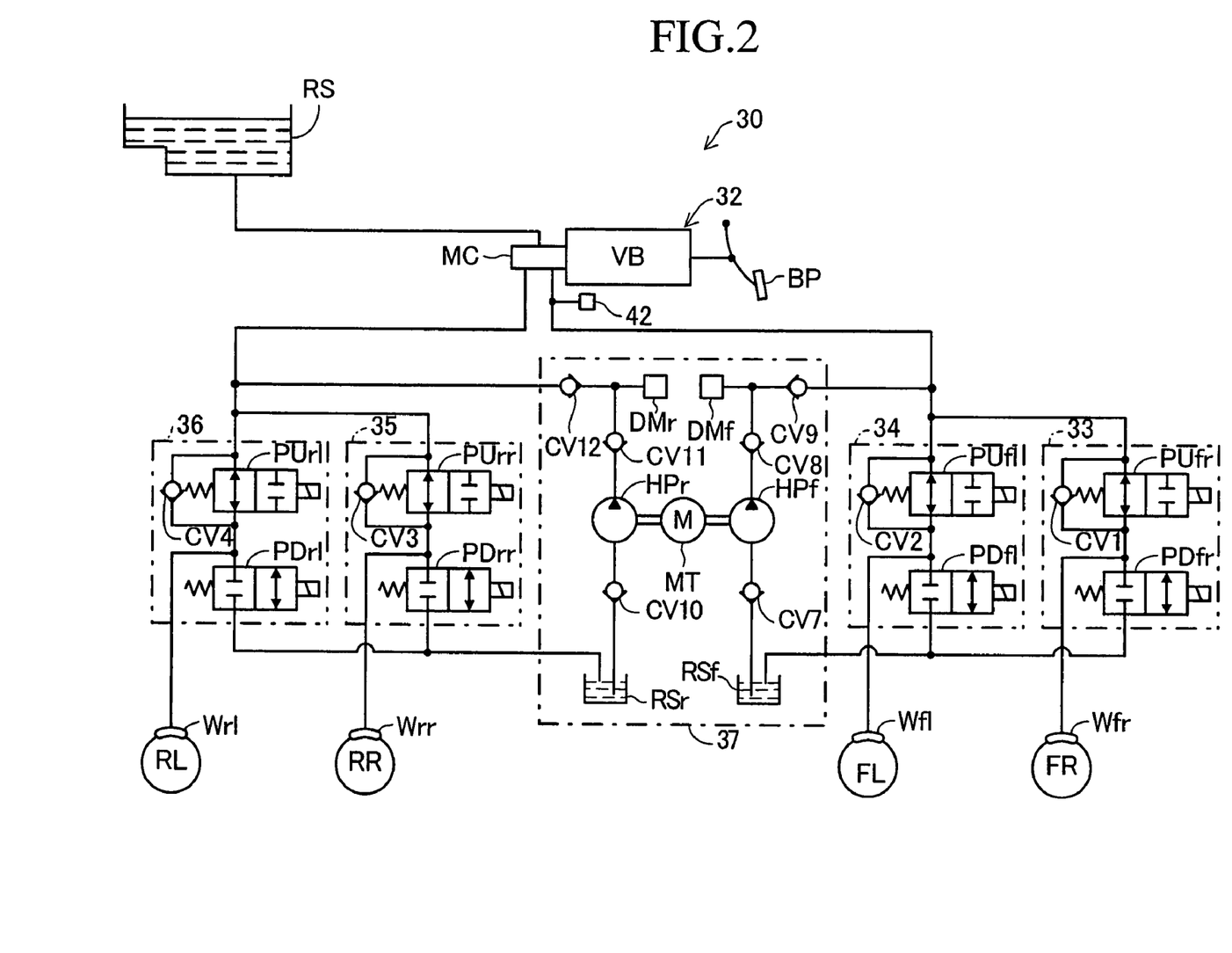
FIG. 2 is a schematic diagram of a brake fluid pressure controller shown in FIG. 1.

As schematically shown in FIG. 2, the brake fluid pressure controller 30 includes a brake fluid pressure generating section 32 which generates brake fluid pressure corresponding to the operating force of a brake pedal BP; an FR brake fluid pressure adjusting section 33, an FL brake fluid pressure adjusting section 34, an RR brake fluid pressure adjusting section 35, and an RL brake fluid pressure adjusting section 36, which can adjust the brake fluid pressures supplied to corresponding wheel cylinders Wfr, Wfl, Wrr, and Wrl respectively installed on the wheels FR, FL, RR, and RL; and a return brake fluid supply section 37.

The brake fluid pressure generating section 32 includes a vacuum booster VB which operates in response to operation of the brake pedal BP, and a master cylinder MC which is linked to the vacuum booster VB. The vacuum booster VB utilizes the pressure (negative pressure) of air within the intake pipe 21a of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder fluid pressure corresponding to the boosted operating force. The master cylinder MC also generates from the second port a second master cylinder fluid pressure which is substantially the same as the first master cylinder fluid pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB generate first and second master cylinder fluid pressures corresponding to the operating force of the brake pedal BP.

The first port of the master cylinder MC is connected to the upstream side of the FR brake fluid pressure adjusting section 33 and the upstream side of the FL brake fluid pressure adjusting section 34. Similarly, the second port of the master cylinder MC is connected to the upstream side of the RR brake fluid pressure adjusting section 35 and the upstream side of the RL brake fluid pressure adjusting section 36. Thus, the first master cylinder fluid pressure is supplied to the upstream side of the FR brake fluid pressure adjusting section 33 and the upstream side of the FL brake fluid pressure adjusting section 34, and the second master cylinder fluid pressure is supplied to the upstream side of the RR brake fluid pressure adjusting section 35 and the upstream side of the RL brake fluid pressure adjusting section 36.

The FR brake fluid pressure adjusting section 33 consists of a pressure increasing valve PUfr, which is a normally-open solenoid valve of a 2-port, 2-position type, and a pressure reducing valve PDfr, which is a normally-closed solenoid valve of a 2-port, 2-position type. When the pressure increasing valve PUfr is in its first position (a position in a nonexcited state) shown in FIG. 2, it establishes communication between the upstream side of the FR brake fluid pressure adjusting section 33 and the wheel cylinder Wfr. When the pressure increasing valve PUfr is in its second position (a position in an excited state), it breaks the communication between the upstream side of the FR brake fluid pressure adjusting section 33 and the wheel cylinder Wfr. When the pressure reducing valve PDfr is in its first position (a position in a nonexcited state) shown in FIG. 2, it breaks communication between the wheel cylinder Wfr and a reservoir RSf. When the pressure reducing valve PDfr is in its second position (a position in an excited state), it establishes the communication between the wheel cylinder Wfr and the reservoir RSf.

With this structure, when the pressure increasing valve PUfr and the pressure reducing valve PDfr are in their first positions, the fluid pressure in the wheel cylinder Wfr is increased upon supply of pressurized brake fluid from the upstream side of the FR brake fluid pressure adjusting section 33 into the wheel cylinder Wfr. When the pressure increasing valve PUfr is in the second position and the pressure reducing valve PDfr is in the first position, regardless of the fluid pressure in the upstream side of the FR brake fluid pressure adjuster 33, the fluid pressure in the wheel cylinder Wfr at the time of changeover is maintained. When the pressure increasing valve PUfr and the pressure reducing valve PDfr are in their second positions, the brake fluid within the wheel cylinder Wfr is allowed to return to the reservoir RSf, whereby the fluid pressure in the wheel cylinder Wfr is decreased.

A check valve CV1 which allows flow of the brake fluid in only one direction from the wheel cylinder side Wfr to the upstream side of the FR brake fluid pressure adjuster 33 is connected in parallel with pressure increasing valve PUfr. As a result, when the brake pedal BP is released after being operated, the brake fluid pressure in the wheel cylinder Wfr is rapidly decreased.

Similarly, the FL brake fluid pressure adjuster 34, the RR brake fluid pressure adjuster 35, and the RL brake fluid pressure adjuster 36 comprise a pressure increasing valve PUfl and a pressure reducing valve PDfl, a pressure increasing valve PUrr and a pressure reducing valve PDrr, and a pressure increasing valve PUrl and a pressure reducing valve PDEl, respectively. By controlling the positions of each pressure increasing valve and pressure reducing valve, the brake fluid pressure in the wheel cylinder Wfl, the wheel cylinder Wrr, and the wheel cylinder Wrl can be increased, maintained, or decreased. Checks valves CV2, CV3, and CV4 are provided in parallel with the pressure increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps via a check valve CV7 the brake fluid returned from the pressure reducing values PDfr and PDfl to the reservoir RSf, and supplies the pumped brake fluid to the upstream sides of the FR brake fluid pressure adjuster 33 and the FL brake fluid pressure adjuster 34 via check valves CV8 and CV9.

Similarly, the hydraulic pump HPr pumps via a check valve CV10 the brake fluid returned from the pressure reducing values PDrr and PDEl to the reservoir RSr, and supplies the pumped brake fluid to the upstream sides of the RR brake fluid pressure adjuster 35 and the RL brake fluid pressure adjuster 36 via check valves CV11 and CV12. Notably, in order to reduce pulsations of discharge pressures of the hydraulic pumps HPf and HPr, dampers DMf and DMr are disposed in a hydraulic circuit between the check valves CV8 and CV9 and a hydraulic circuit between the check valves CV11 and CV12, respectively.

With the structure described above, when all the solenoid valves are in their first positions, the brake fluid pressure controller 30 supplies to each wheel cylinder a brake fluid pressure corresponding to the operating force of the brake pedal BP. In this state, it become possible to decrease only the brake fluid pressure in, for example, the wheel cylinder Wrr by a prescribed amount through control of the pressure increasing valve PUrr and the pressure reducing valve PDrr. That is, the brake fluid pressure controller 30 can individually decrease the brake fluid pressure in the wheel cylinder of each wheel from the brake fluid pressure corresponding to the operating force of the brake pedal BP.

Meanwhile, the vehicle control apparatus 10 includes wheel speed sensors 41*fl*, 41*fr*, 41*rl*, and 41*rr* (see FIG. 1) which each output a signal having a pulse each time the corresponding wheel rotates by a prescribed angle; and a pressure sensor 42 (see FIG. 2) for detecting the first master cylinder fluid pressure generated by the master cylinder MC and for outputting a signal indicative of the first master cylinder fluid pressure.

Moreover, the vehicle control apparatus 10 includes an electronic controller 50. The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which store data when the power supply is on and which maintains the stored data when the power supply is cut off; an interface 55 containing A/D converters; and the like. The above components are interconnected via a bus.

The interface 55 is connected to the above sensors 41 and 42 and supplies signals from the sensors 41 and 42 to the CPU 51, and it outputs drive signals to each of the solenoid valves and the motor MT of the brake fluid pressure controller 30, the throttle valve actuator 22, the fuel injection apparatus 23, and a power transistor Tr, which will be described later, in accordance with instructions from the CPU 51.

The throttle valve actuator 22 (CPU 51) drives the throttle valve TH so that the opening of the throttle valve TH becomes an opening corresponding to the operating position of an unillustrated accelerator pedal, and the fuel injection apparatus 23 (CPU 51) injects a necessary amount of fuel so as to obtain a target air-fuel ratio (a theoretical air-fuel ratio) with respect to the air intake amount corresponding to the opening of the throttle valve TH.

The brake fluid pressure controller 30 (CPU 51) executes the above-described ABS control, which is the control of properly decreasing the brake fluid pressure for a specific wheel from the brake fluid pressure corresponding to the operating force of the brake pedal BP, when the specific wheel tends to lock while the driver is operating the brake pedal BP. Since the details of the ABS control are well known, a repeated description therefor will be omitted.

Outline of Rotational Speed Control for Motor MT

The pump drive motor control apparatus according to the present invention (hereinafter, may be referred to as the "present apparatus") incorporated in the above-described vehicle control apparatus 10 is applied to the above-described motor MT, and is designed to control the rotational speed of the motor MT by use of the power transistor (switching element) Tr shown in FIG. 3 and incorporated in the electronic controller 50, while the predetermined pump (the hydraulic pumps HPf, HPr) drive-control condition is satisfied.

Figure 3:
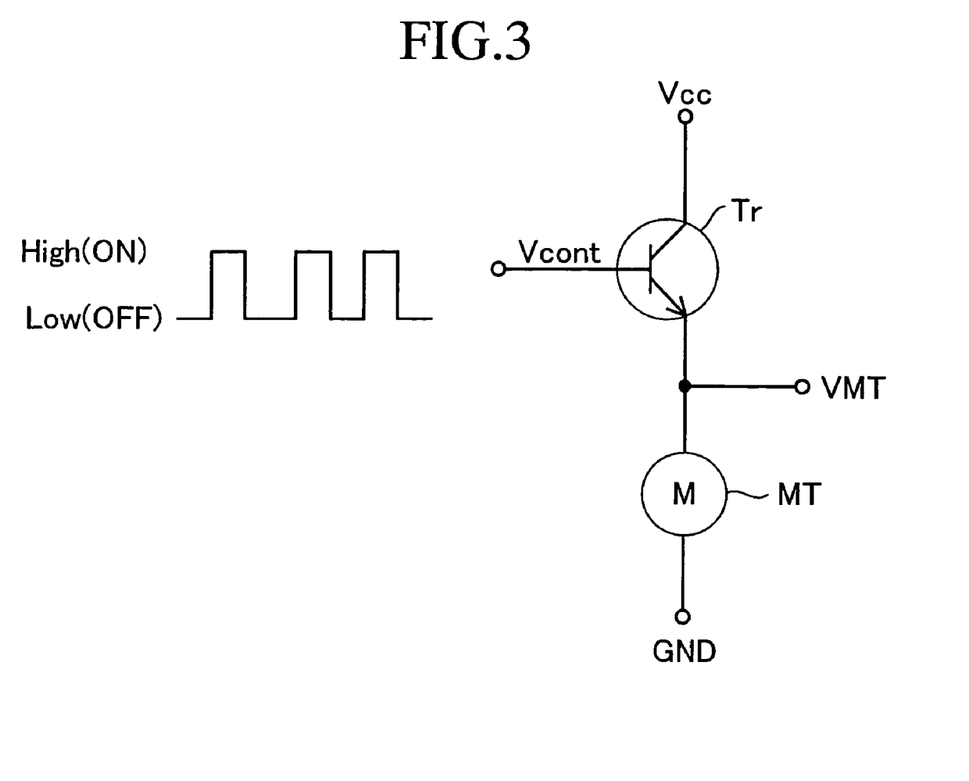
FIG. 3 is a schematic diagram of a drive circuit for driving and controlling a motor MT shown in FIG. 2.

More specifically, as shown in FIG. 3, the collector terminal of the power transistor Tr is connected to the power source (voltage: Vcc (12 V in the present example)) of the vehicle, and the emitter terminal of the power transistor Tr is connected to one terminal of the motor MT. The other terminal of the motor MT is grounded (voltage: GND level). A motor control signal Vcont, which is generated in accordance with an instruction from the present apparatus (CPU 51), is applied to the base terminal of the power transistor Tr.

As shown in FIG. 3, the motor control signal Vcont is generated to assume a High level or a Low level. The power transistor Tr is in an on state when the motor control signal Vcont is at the High level, and is in an off state when the motor control signal Vcont is at the Low level. In other words, when the motor control signal Vcont is at the High level, the voltage Vcc is applied to the motor MT, whereby the motor MT drives the hydraulic pumps HPf and HPr (the supply of electricity to the motor MT is effected), and when the motor control signal Vcont is at the Low level, the voltage Vcc is not applied to the motor MT (the supply of electricity to the motor MT is stopped).

As a result, when the motor control signal Vcont is at the High level, a motor inter-terminal voltage VMT (see FIG. 3), which is a voltage between the two terminals of the motor MT, becomes constant (voltage Vcc). Meanwhile, when the motor control signal Vcont is at the Low level, a voltage generated by the motor MT is output as the motor inter-terminal voltage VMT. The voltage generated by the motor MT is an induced voltage or electromotive force which the motor MT generates as a result of acting as a generator. The generated voltage decreases with the rotational speed of the motor MT, which continues rotation because of inertia, and becomes zero when the rotational speed becomes zero.

The present apparatus performs the following control. When the motor inter-terminal voltage VMT (accordingly, the generated voltage) becomes equal to or less than a voltage threshold VMTTH, which serves as a predetermined threshold, in a state in which the motor control signal Vcont is at the Low level (accordingly, the supply of electricity to the motor MT is stopped), the present apparatus switches the motor control signal Vcont from the Low level to the High level (accordingly, resumes the supply of electricity to the motor MT), and maintains the motor control signal Vcont at the High level for a predetermined period of time Thigh after the switching (accordingly, continues the supply of electricity to the motor MT for the predetermined period of time Thigh after the switching) so as to drive the hydraulic pumps HPf and HPr. Subsequently, the present apparatus switches the motor control signal Vcont from the High level to the Low level (accordingly, stops the supply of electricity to the motor MT) so as to stop the drive of the hydraulic pumps HPf and HPr. In this state (the motor control signal Vcont is at the Low level), the motor inter-terminal voltage VMT (accordingly, the generated voltage) decreases with the rotational speed of the motor MT, which continues rotation because of inertia. When the motor inter-terminal voltage VMT becomes equal to or less than the voltage threshold VMTTH, the present apparatus again switches the motor control signal Vcont from the Low level to the High level. The present apparatus starts such an operation simultaneously with the start of ABS control (accordingly, the predetermined pump drive-control condition is satisfied simultaneously with the start of ABS control), and so long as the predetermined pump drive-control condition is satisfied, the present apparatus repeats the above-described operation so as to start and stop the supply of electricity to the motor MT, to thereby control the rotational speed of the motor MT. As is understood from the above, the means for controlling the rotational speed of the motor MT corresponds to the control means.

Incidentally, if the reservoirs RSf and RSr are filled with brake fluid, the ABS control fails as described above. Accordingly, the hydraulic pumps HPf and HPr must pump (discharge) brake fluid from the reservoirs RSf and RSr in order to prevent the brake fluid from filling the reservoirs RSf and RSr.

The discharge flow rates of the hydraulic pumps HPf and HPr increase with the rotational speed of the motor MT, which drives the hydraulic pumps HPf and HPr. Further, the flow rate of brake fluid returned to the reservoirs RSf and RSr varies in accordance with the operation conditions of ABS control (specifically, operation conditions (open/close timings, etc.) of the pressure reducing valves PDfr, etc.). Accordingly, in order to avoid the failure of ABS control in the case where the rotational speed (the time average thereof) of the motor MT is set constant, the rotational speed of the motor is preferably set to a high level such that the pumps can pump (discharge) brake fluid from the reservoirs RSf and RSr at a flow rate corresponding to the expected maximum flow rate of brake fluid returned to the reservoirs RSf and RSr.

Meanwhile, the above-described hydraulic pumps HPf and HPr and the motor MT are strongly desired to reduce their operation sound to the extent possible. The lower the rotational speed of the motor MT, the smaller the operation sound. In view of this, the rotational speed of the motor MT is strongly desired to be lowered to the extent possible.

As described above, in general, cases where ABS control is started can be classified into a case where excessively abrupt braking is demanded and a case where depressing force control is performed; in the case where the depressing force control is performed, the flow rate of brake fluid returned to the reservoirs RSf and RSr becomes relatively low over a short period of time immediately after the start of ABS control. Accordingly, in this case, during a short period of time immediately after the start of ABS control, even when the rotational speed of the motor MT is set to a relatively low level, failure of the ABS control hardly occurs. Accordingly, during such a short period of time, it is advantageous to set the rotational speed of the motor MT to a low level with higher priority placed on reduction of operation sound over reliable avoidance of failure of ABS control.

By contrast, in the case where excessively abrupt braking is demanded, as described previously, a driver generally tends to operate the brake pedal BP quickly and strongly. As a result, the flow rate of brake fluid returned to the reservoirs RSf and RSr often increases to a relatively high level immediately after the start of ABS control, with a resultant increase in the possibility that failure of ABS control occurs in a relatively early stage immediately after the start of ABS control. Accordingly, in such a case, the rotational speed of the motor MT is preferably set to a relatively high level immediately after the start of ABS control, whereby higher priority can be placed on avoidance of failure of ABS control over reduction of operation sound.

Moreover, in the case where excessively abrupt braking is demanded, the brake pedal BP is operated quickly and strongly, and both the master cylinder fluid pressure Pmc and its time-differentiated value DPmc assume large values. Accordingly, the determination as to whether the cause of start of ABS control is a demand for excessively abrupt braking can be made on the basis of the master cylinder fluid pressure Pmc. Moreover, the rotational speed of the motor MT depends on the above-described voltage threshold VMTTH, and increases with the voltage threshold VMTTH.

In view of the foregoing, when ABS control is started, determination as to whether the present case is the case where excessively abrupt braking is demanded is made on the basis of the master cylinder fluid pressure Pmc and its time-differentiated value DPmc at that point in time. When the present case is determined not to be the case where excessively abrupt braking is demanded (accordingly, the case where depressing force control is performed), as indicated by a solid line in FIG. 4, the voltage threshold VMTTH is set to a relatively small value (first value) V0 during a period before elapse of a predetermined period of time Tlow after the start of ABS control, and is set to a value (second value) V1 greater than the value V0 after elapse of the period of time Tlow. The value V1 is a value which causes the motor MT to rotate the pumps at a high rotational speed such that the pumps can pump (discharge) brake fluid from the reservoirs RSf and RSr at a flow rate corresponding to the expected maximum flow rate of brake fluid returned to the reservoirs RSf and RSr. Further, the predetermined period of time Tlow is a period of time such that ABS control can continue in the case where the depressing force control is performed.

Figure 4:
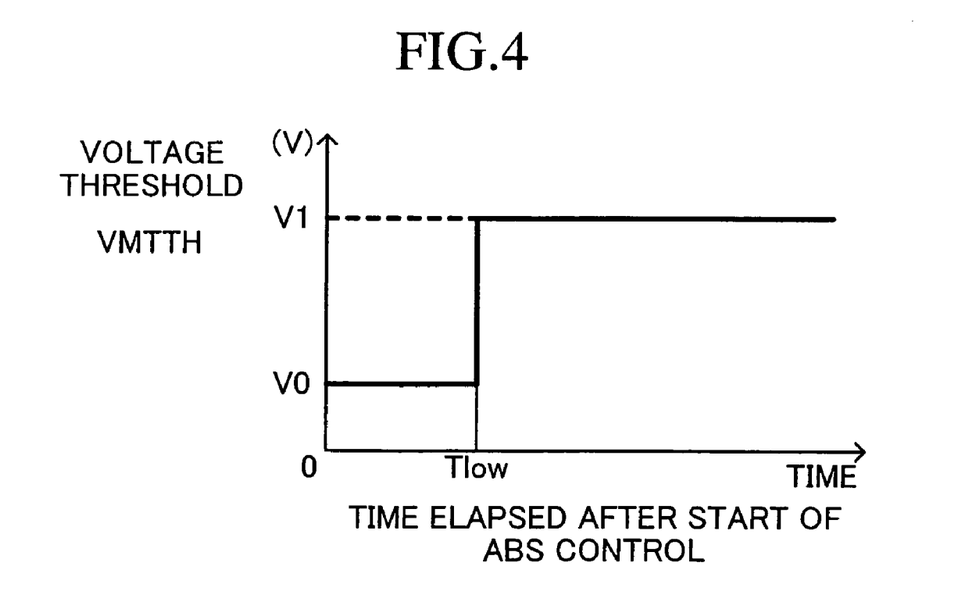
FIG. 4 is a graph showing the relationship between voltage threshold and time after start of ABS control.

Meanwhile, when the present case is determined to be the case where excessively abrupt braking is demanded, as indicated by a broken line in FIG. 4, the voltage threshold VMTTH is set to the value V1 (third value) immediately after the start of ABS control. As is understood from the above, the means for setting the voltage threshold VMTTH corresponds to the threshold setting means.

Figure 5:
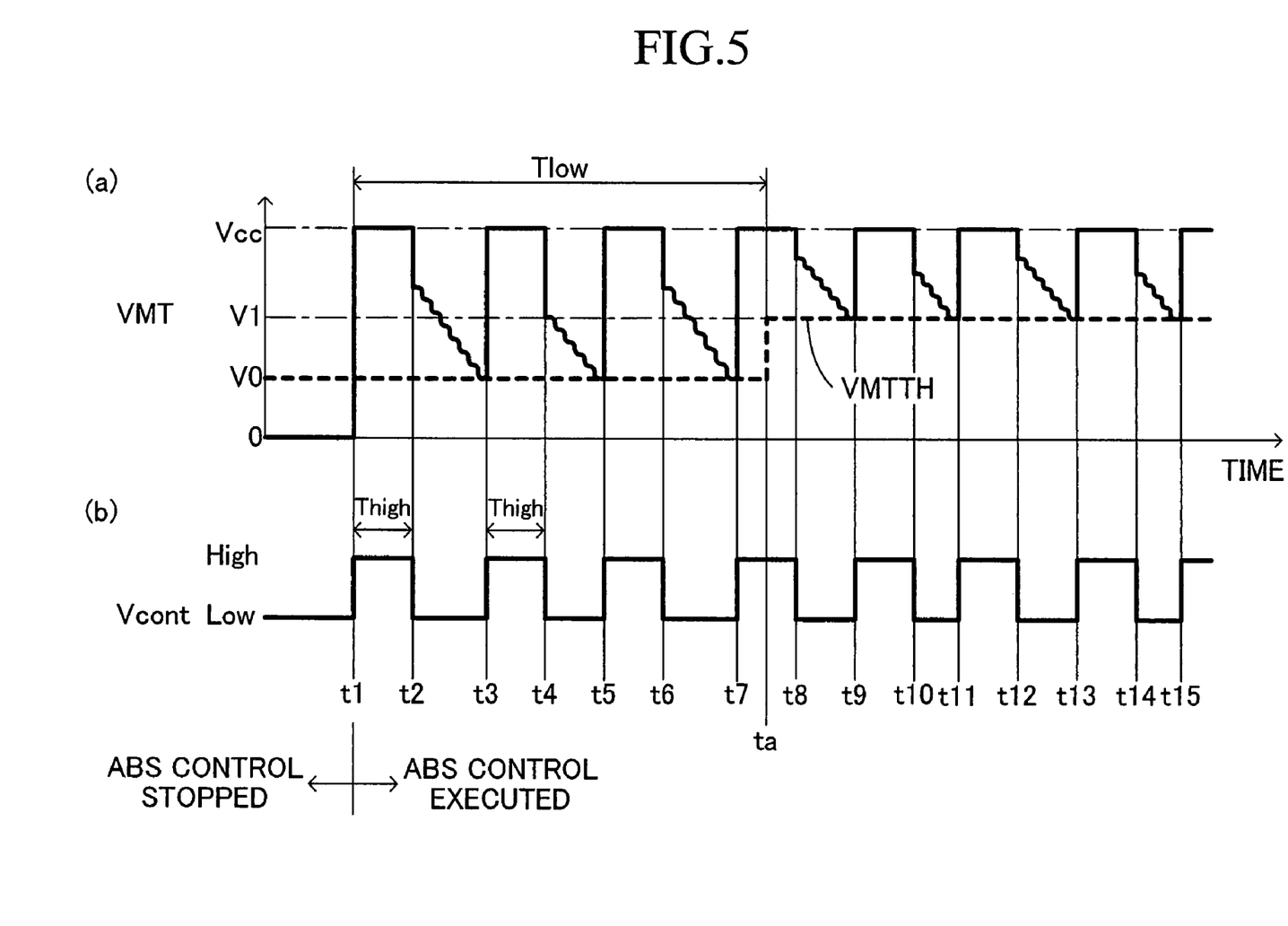
FIG. 5 is a time chart showing example changes in the motor inter-terminal voltage and motor control signal shown in FIG. 3 during execution of ABS control (during drive-control of the motor MT)

FIG. 5 is a time chart showing example changes in the motor inter-terminal voltage VMT and the motor control signal Vcont for the case in which a certain wheel is locked because of the driver's operation of the brake pedal BP, and ABS control is started at time t1 (accordingly, the case in which the predetermined pump drive-control condition is satisfied at and after time t1). This time chart shows the case in which ABS control has been started stemming from the driver's depressing force control. Accordingly, the voltage threshold VMTTH is set to the value V0 during a period between time t1 and time ta at which the predetermined period of time Tlow elapses after time t1, and is set to the value V1 after time ta.

As shown in FIG. 5, before time t1, the motor control signal Vcont is maintained at the Low level (see (b)), and the hydraulic pumps HPf and HPr are stopped, so that the motor inter-terminal voltage VMT is 0 V (see (a)). When time t1 is reached in this state, because the motor inter-terminal voltage VMT (=0 V) is lower than the voltage threshold VMTTH (=V0), the present apparatus switches the motor control signal Vcont from the Low level to the High level at time t1, and maintains the motor control signal Vcont at the High level until the predetermined period of time Thigh elapses after time t1 (i.e., from t1 to t2). As a result, during the period of t1 to t2, the motor inter-terminal voltage VMT is maintained at a constant level (Vcc), and the motor MT (accordingly, the hydraulic pumps HPf and HPr) is driven.

At time t2, the present apparatus switches the motor control signal Vcont from the High level to the Low level so as to stop the drive of the motor TM (accordingly, the hydraulic pumps HPf and HPr). As a result, after time t2, due to influence of the braking force which is imposed on the motor MT by means of brake fluid remaining on the discharge sides of the hydraulic pumps HPf and HPr, and the like, the rotational speed of the motor MT gradually decreases, and the motor inter-terminal voltage VMT (accordingly, the above-described generated voltage) gradually decreases.

Subsequently, during a period before time ta in which the voltage threshold VMTTH is maintained at the value V0, whenever the motor inter-terminal voltage VMT decreases to the value V0 (see times t3, t5, and t7), the present apparatus switches the motor control signal Vcont from the Low level to the High level, and, upon passage of the predetermined period of time Thigh (see times t4, t6, and t8), switches the motor control signal Vcont from the High level to the Low level.

Meanwhile, in a period after time ta, during which the voltage threshold VMTTH is maintained at the value V1, whenever the motor inter-terminal voltage VMT decreases to the value V1 (see times t9, t11, t13, and t15), the present apparatus switches the motor control signal Vcont from the Low level to the High level, and, upon passage of the predetermined period of time Thigh (see times t10, t12 and t14), switches the motor control signal Vcont from the High level to the Low level.

As described above, in the case where depressing force control is performed, the present apparatus sets the voltage threshold VMTTH to a relatively small value during a period before elapse of the predetermined period of time Tlow after the start of ABS control, to thereby reduce the rotational speed (its time average) of the motor MT. The above is the outline of the rotational speed control for the motor MT.

Actual Operation

The actual operation of the vehicle control apparatus 10 including the pump drive motor control apparatus according to the present invention having the above-described structure will be explained while referring to FIGS. 6 to 9, which show, in the form of flowcharts, routines which are executed by the CPU 51 of the electronic controller 50. Notably, the symbol  attached to the ends of various variables and the like collectively represents the symbols fl, fr, rl, and rr and indicates that the particular variable or the like applies to all of the wheels FR, FL, etc. of the vehicle. For example, the wheel speed Vw collectively indicates the front left wheel speed Vwfl, the front right wheel speed Vwfr, the rear left wheel speed Vwrl, and the rear right wheel speed Vwrr.

Figure 6:
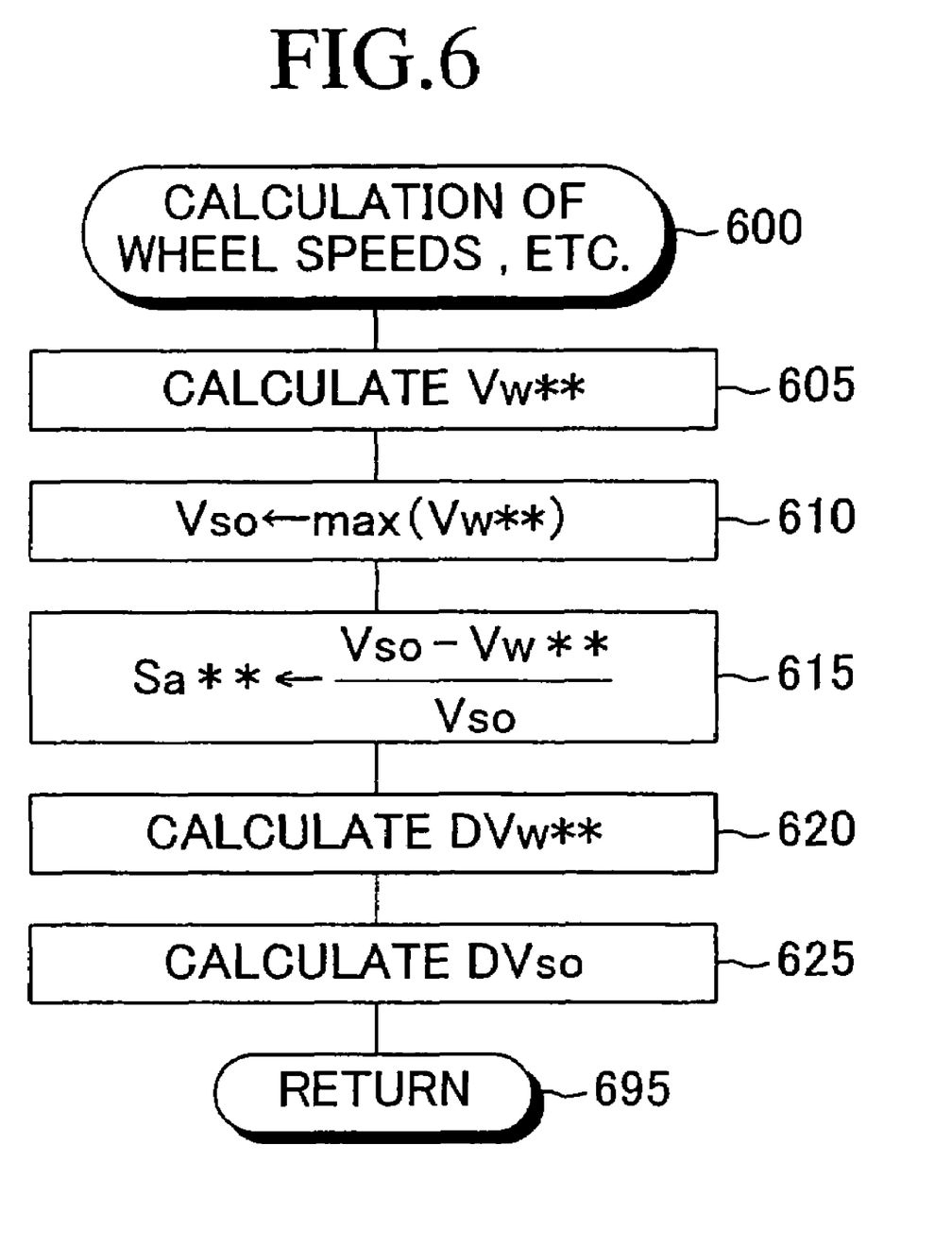
FIG. 6 is a flowchart showing a routine which the CPU shown in FIG. 1 executes in order to calculate wheel speed, etc.

At predetermined time intervals, the CPU 51 repeatedly performs a routine shown in FIG. 6 for calculating the wheel speed Vw and other parameters. Accordingly, when a predetermined timing is reached, the CPU 51 starts processing of the routine from Step 600, and proceeds to Step 605 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41 outputs.

Next, the CPU 51 proceeds to Step 610 and calculates the largest value among the wheel speeds Vw as the estimated vehicle body speed Vso. Notably, the average of the wheel speeds Vw may be calculated as the estimated vehicle body speed Vso. Subsequently, the CPU 51 proceeds to Step 615 and calculates the actual slip rate Sa of the wheel on the basis of the value of the estimated vehicle body speed Vso calculated in Step 610, the value of the wheel speed Vw** calculated in Step 605, and the equation shown in Step 615.

Subsequently, the CPU 51 proceeds to Step 620 and calculates the wheel acceleration DVw of the wheel, which is a time-differentiated value of the wheel speed Vw**, in accordance with the following Eq. 1. In Step 625 subsequent to Step 620, the CPU 51 calculates the estimated vehicle body acceleration DVso, which is a time-differentiated value of the estimated vehicle body speed Vso calculated in Step S610, in accordance with the following Eq. 2. Subsequently, the CPU 51 proceeds to Step 695 so as to end the present routine. After that, the CPU 51 repeatedly executes the present routine.

$$DVw^{}=(Vw^{}-Vwl^{*})/\Delta t \qquad \text{Eq. 1}$$

$$DVso=(Vso-Vsol)/\Delta t \qquad \text{Eq. 2}$$

In Eq. 1, Vwl represents the wheel speed Vw calculated in Step 605 during the previous execution of the present routine, and Δt represents the length of the above-described, predetermined intervals (the computation cycles of the CPU 51). In Eq. 2, Vsol represents the estimated vehicle body speed Vso calculated in Step 610 during the previous execution of the present routine.

Next, operation for determining start and end of ABS control will be described. The CPU 51 repeatedly performs a routine shown in FIG. 7 at predetermined time intervals.

Figure 7:
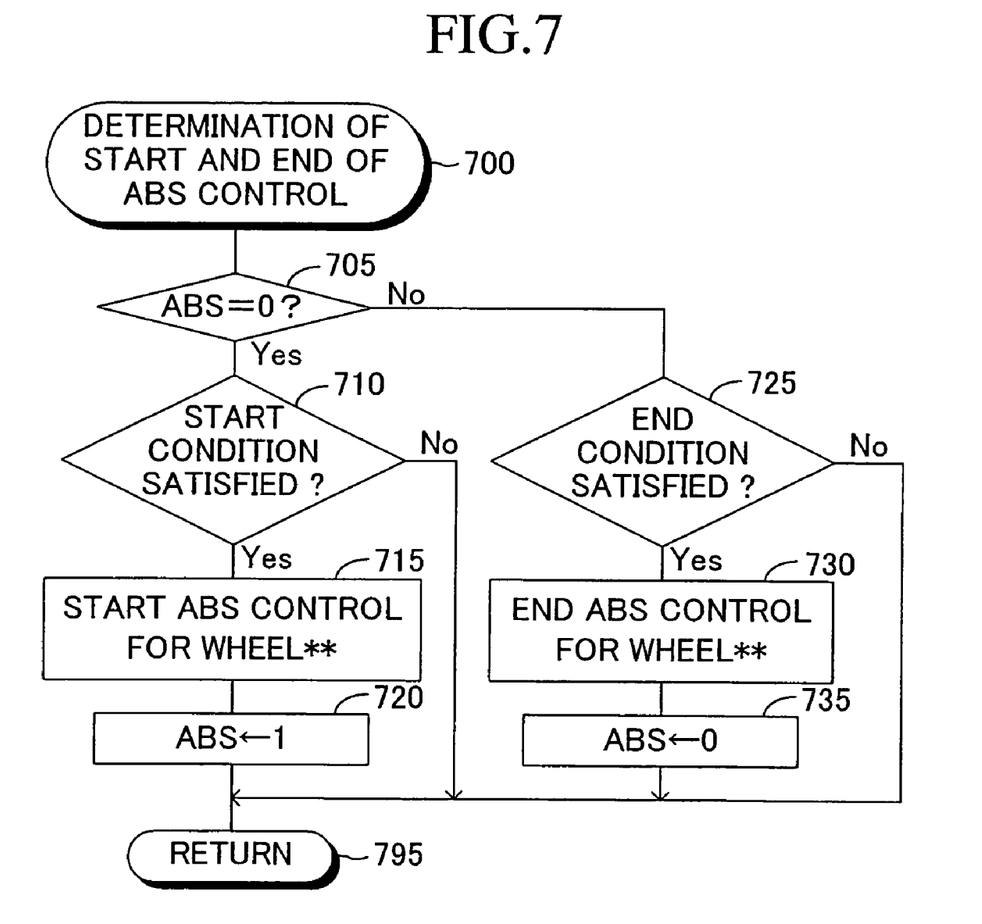
FIG. 7 is a flowchart showing a routine which the CPU shown in FIG. 1 executes in order to make judgment on start and end of ABS control.

Accordingly, when a predetermined timing is reached, the CPU 51 starts processing of the routine from Step 700, and proceeds to Step 705 so as to determine whether the value of an ABS control execution flag ABS is "0." When the value is "1," the ABS control execution flag ABS indicates that the above-described ABS control is currently performed. When the value is "0," the ABS control execution flag ABS indicates that the above-described ABS control is currently halted.

The description will be continued on the assumption that the ABS control is currently halted, and ABS control start condition, which will be described later, has not been satisfied. In this case, since the value of the ABS control execution flag ABS has been set to "0," the CPU 51 makes a "Yes" determination in Step 705, and then proceeds to Step 710 in order to determine whether the ABS control start condition is satisfied. The ABS control start condition is satisfied when, for example, the absolute value of the latest wheel acceleration DVw of a specific wheel (at least one wheel) calculated in the previous Step 620 (wheel deceleration IDVwl) is greater than a predetermined deceleration reference value DVwref (positive value), and the latest actual slip rate Sa of the specific wheel calculated in the previous Step 615 is greater than a predetermined slip rate reference value Sref (positive value).

At the present stage, the ABS control start condition is not satisfied as described above. Therefore, the CPU 51 makes a "No" determination in Step 710, and immediately proceeds to Step 795 in order to end the present routine. After that, until the ABS control start condition is satisfied, the CPU 51 repeatedly executes the processing in Steps 700 to 710 and Step 795 at the predetermined intervals.

Next, the description will be continued on the assumption that the ABS control start condition is satisfied in this state. In this case, the CPU 51 makes a "Yes" determination when it proceeds to Step 710, and then proceeds to Step 715 in order to start ABS control for a wheel corresponding to the specific wheel. In Step 720 subsequent to Step 715, the CPU 51 sets the value of the ABS control execution flag ABS to "1." After that, the CPU 51 proceeds to Step 795** so as to end the present routine.

Since the ABS control execution flag ABS has been set to "1" as a result of the processing in Step 720, the CPU 51 makes a "No" determination when it proceeds to Step 705, and then proceeds to Step 725 in order to determine whether a predetermined ABS control end condition is satisfied. Since the present stage is immediately after the ABS control has been started, the ABS control end condition is not satisfied. Therefore, the CPU 51 makes a "No" determination in Step 725, and immediately proceeds to Step 795 in order to end the present routine.

After that, until the ABS control end condition is satisfied, the CPU 51 repeatedly executes the processing in Steps 700, 705, 725, and 795 at the predetermined intervals. In other words, the value of the ABS control execution flag ABS is maintained at "1" during execution of the ABS control.

Next, the description will be continued on the assumption that the ABS control end condition is satisfied in this state. In this case, the CPU 51 makes a "Yes" determination when it proceeds to Step 725, and then proceeds to Step 730 in order to stop the ABS control performed for all the wheels. In Step 735 subsequent to Step 730, the CPU 51 sets the value of the ABS control execution flag ABS to "0." After that, the CPU 51 proceeds to Step 795** so as to end the present routine.

Since the ABS control execution flag ABS has been set to "0" as a result of the processing in Step 735, the CPU 51 makes a "Yes" determination when it proceeds to Step 705, and then proceeds to Step 710 in order to again perform monitoring for determining whether the ABS control start condition is satisfied. Until the ABS control start condition is again satisfied, the CPU 51 repeatedly executes the processing in Steps 700 to 710 and 795. In other words, the value of the ABS control execution flag ABS is maintained at "0" while the ABS control is stopped.

Next, operation for setting the above-described voltage threshold VMTTH will be described. The CPU 51 repeatedly performs a routine shown in FIG. 8 at predetermined time intervals. Accordingly, when a predetermined timing is reached, the CPU 51 starts processing of the routine from Step 800, and proceeds to Step 805 so as to determine whether the above-described pump drive-control condition is satisfied. When the CPU 51 makes a "No" determination, the CPU 51 immediately proceeds to Step 860 so as to store, as a last master cylinder fluid pressure Pmcl, the present master cylinder fluid pressure Pmc detected by the pressure sensor 42. Subsequently, the CPU 51 proceeds to Step 895 so as to end the present routine.

Figure 8:
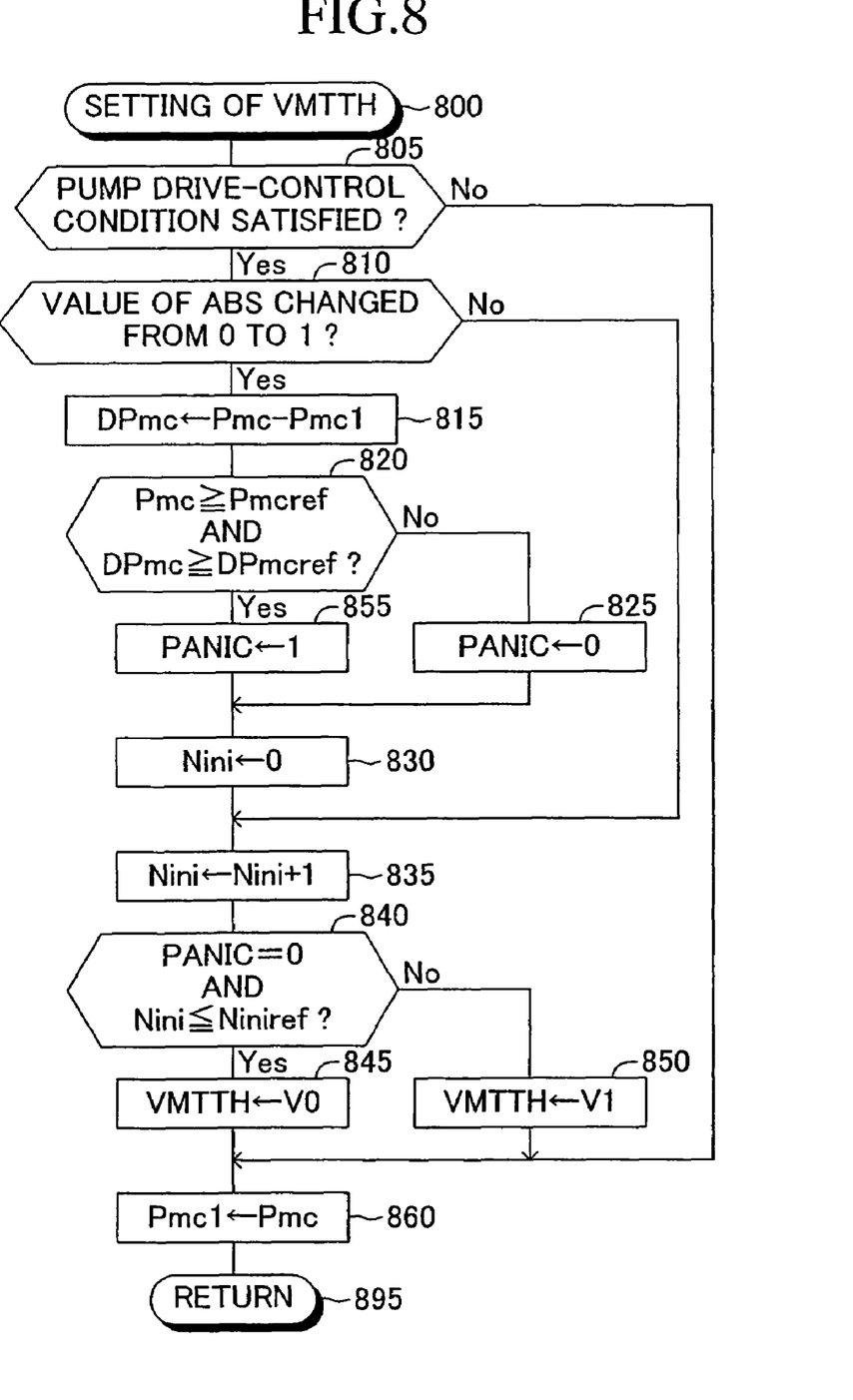
FIG. 8 is a flowchart showing a routine which the CPU shown in FIG. 1 executes in order to set a voltage threshold.

The pump drive-control condition is satisfied, for example, over a period between a point in time at which the ABS control is started and a point in time at which a predetermined period of time has elapsed after the end of the ABS control. In other words, the pump drive-control condition is satisfied over a period between a point in time at which the value of the ABS control execution flag ABS changes from "0" to "1" and a point in time at which the predetermined period of time has elapsed after the value of the ABS control execution flag ABS changes from "1" to "0."

Here, the description will be continued on the assumption that the present point in time is immediately after the pump drive-control condition has been satisfied (see, for example, t1 in FIG. 5). In this case, the CPU 51 makes a "Yes" determination in Step 805, and then proceeds to Step 810 in order to judge whether the value of the ABS control flag ABS has changed from "0" to "1."

The present stage is immediately after the ABS control has been started; i.e., immediately after the value of the ABS control execution flag ABS has been changed from "0" to "1" by means of the processing in the previous Step 720. Therefore, the CPU 51 makes a "Yes" determination in Step 810, and then proceeds to Step 815 in order to store, as a time-differentiated value DPmc of the master cylinder liquid pressure, a value obtained by subtracting, from the present master cylinder fluid pressure Pmc, the last master cylinder fluid pressure Pmcl already set by means of the processing in Step 860 during the previous execution of the present routine.

Next, the CPU 51 proceeds to Step 820 in order to determine whether the master cylinder fluid pressure Pmc at the present (i.e., at the time when the ABS control starts) is equal to or greater than a predetermined reference master cylinder fluid pressure Pmcref and whether the time-differentiated value DPmc of the master cylinder liquid pressure at the present is equal to or greater than a predetermined reference master cylinder fluid pressure time-differentiated value DPmcref (i.e., whether the present case is the case where excessively abrupt braking is demanded).

The description is continued on the assumption that the present case is not the case where excessively abrupt braking is demanded (accordingly, the present case is the case where depressing force control is performed). In this case, the CPU 51 makes a "No" determination in Step 820, and proceeds to Step 825 so as to set the value of an abrupt braking demand flag PANIC to "0." When the value is "1," the abrupt braking demand flag PANIC indicates that the present case is the case where excessively abrupt braking is demanded. When the value is "0," the abrupt braking demand flag PANIC indicates that the present case is the case where depressing force control is performed.

Subsequently, the CPU 51 clears or sets a counter value Nini to "0" in Step 830, and increments the counter value Nini ("0" at the present stage) by "1" in Step 835. The counter value Nini represents a time elapsed after the start of ABS control.

Subsequently, the CPU 51 proceeds to Step 840 in order to determine whether the value of the abrupt braking demand flag PANIC is "0" and the counter value Nini is not greater than a reference value Niniref, which corresponds to the predetermined period of time Tlow. The present stage is immediately after the start of ABS control, and the value of the abrupt braking demand flag PANIC is "0." Accordingly, the CPU 51 makes a "Yes" determination in Step 840, and proceeds to Step 845 in order to set, as the voltage threshold VMTTH, the value V0 smaller than the value V1. In Step 860 subsequent to Step 845, the CPU 51 stores the master cylinder fluid pressure Pmc as the last master cylinder fluid pressure Pmcl. After that, the CPU 51 ends the present routine.

After that, so long as the pump drive-control condition is satisfied, the CPU 51 repeatedly executes the processing in Steps 800 to 810, 835 to 845, 860, and 895 until the counter value Nini exceeds the reference value Niniref upon repetition of the processing in Step 835. As a result, through repeated execution of the processing in Step 845, the voltage threshold VMTTH is maintained at the value V0 until the predetermined period of time Tlow elapses after the start of ABS control.

Meanwhile, when the predetermined period of time Tlow elapses in this state (accordingly, when the counter value Nini exceeds the reference value Niniref), the CPU 51 makes a "No" determination when it proceeds to Step 840, and then proceeds to Step 850. In Step 850, the CPU 51 sets the value V1 as the voltage threshold VMTTH (see, for example, time ta in FIG. 5). As a result, after that point in time, so long as the pump drive-control condition is satisfied, the voltage threshold VMTTH is maintained at the value V1 through repeated execution of the processing in Steps 850.

Next, the case where excessively abrupt braking is demanded will be described. In this case, the CPU 51 makes a "Yes" determination in Step 820, and proceeds to Step 855 so as to set the value of the abrupt braking demand flag PANIC to "1." Accordingly, the CPU 51 always makes a "No" determination when it proceeds to Step 840, and proceeds to Step 850. As a result, so long as the pump drive-control condition is satisfied, the voltage threshold VMTTH is maintained at the value V1 through repeated execution of the processing in Steps 850. The voltage threshold VMTTH is set in this manner.

Next, operation for generating the motor control signal Vcont will be described. The CPU 51 repeatedly performs a routine shown in FIG. 9 at predetermined time intervals. Accordingly, when a predetermined timing is reached, the CPU 51 starts processing of the routine from Step 900, and proceeds to Step 905 so as to determine whether a pump drive-control condition similar to that in Step 805 is satisfied.

Here, the description will be continued on the assumption that the pump drive-control condition is satisfied, the motor control signal Vcont is at the Low level, and the motor inter-terminal voltage VMT (see FIG. 3) is not greater than the latest voltage threshold VMTTH, which is repeatedly set and updated by the routine of FIG. 8 (see, for example, time t1 in FIG. 5). The CPU 51 makes a "Yes" determination in Step 905, and proceeds to Step 910 so as to determine whether the value of a high level flag HIGH is "0." When the value is "1," the high level flag HIGH indicates that the motor control signal Vcont is set to the High level. When the value is "0," the high level flag HIGH indicates that the motor control signal Vcont is set to the Low level.

Figure 9:
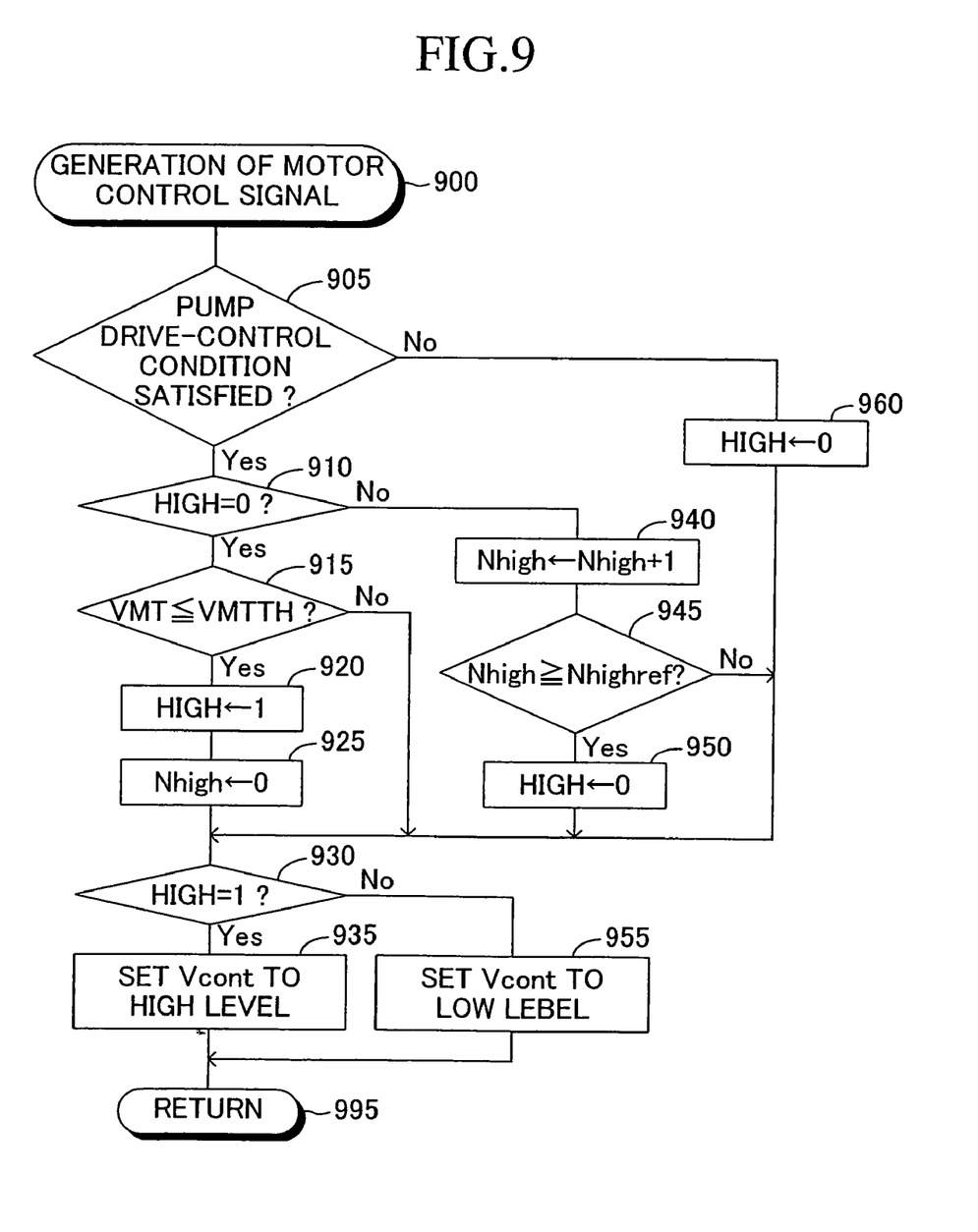
FIG. 9 is a flowchart showing a routine which the CPU shown in FIG. 1 executes in order to generate a motor control signal.

At the present stage, the motor control signal Vcont is at the Low level. Therefore, the CPU 51 makes a "Yes" determination in Step 910, and proceeds to Step 915 so as to determine whether the motor inter-terminal voltage VMT is equal to or smaller than the latest voltage threshold VMTTH. Since the motor inter-terminal voltage VMT is smaller than the latest voltage threshold VMTTH, the CPU 51 makes a "Yes" determination in Step 915, and proceeds to Step 920. The CPU 51 sets the value of the high level flag HIGH to "1" in Step 920, and clears or sets a counter value Nhigh to "0" in Step 925 subsequent to Step 920. The counter value Nhigh represents a time elapsed after the value of the high level flag HIGH has changed from "0" to "1" (i.e., after the motor control signal Vcont has changed from the Low level to the High level).

Subsequently, the CPU 51 proceeds to Step 930 so as to determine whether the value of the high level flag HIGH is "1." At the present stage, the value of the high level flag HIGH has been set to "1" by means of the processing in the previous Step 920. Accordingly, the CPU 51 makes a "Yes" determination in Step 930, and proceeds to Step 935 so as to set the motor control signal Vcont to the High level and supply it to the base terminal of the power transistor Tr (see FIG. 3). Thus, the drive of the motor MT (accordingly, the hydraulic pumps HPf and HPr) is started.

After that, the value of the high level flag HIGH is maintained at "1." Therefore, so long as the pump drive-control condition is satisfied, the CPU 51 makes a "Yes" determination in Step 905 and then a "No" determination in Step 910, and then proceeds to Step 940, in which the CPU 51 increments the counter value Nhigh ("0" at the present stage) by "1."

Subsequently, the CPU 51 proceeds to Step 945 in order to determine whether the counter value Nhigh has become equal to or greater than a predetermined high level maintaining reference value Nhighref corresponding to the predetermined period of time Thigh (accordingly, whether the predetermined period of time Thigh has elapsed after the point in time at which the motor control signal Vcont changes from the Low level to the High level).

Since the present stage is immediately after the motor control signal Vcont has changed from the Low level to the High level, the CPU 51 makes a "No" determination in Step 945, and immediately proceeds to Step 930. Since the value of the high level flag HIGH is maintained at "1," the CPU 51 makes a "Yes" determination in Step 930, and again performs the processing in Step 935. After that, until the counter value Nhigh reaches the predetermined high level maintaining reference value Nhighref upon repeated execution of the processing in Step 940 (accordingly, until the predetermined period of time Thigh elapses), the CPU 51 repeatedly executes the processing in Steps 900 to 910, 940, 945, 930, and 935 at the predetermined intervals. Thus, the supply of the motor control signal Vcont of the High level to the power transistor Tr is continued (see, for example, a period between t1 to t2 in FIG. 5), so that the drive of the motor MT (accordingly, the hydraulic pumps HPf and HPr) is continued.

Here, the predetermined period of time Thigh is assumed to have elapsed in this state (see, for example, time t2 in FIG. 5). In this case, the CPU 51 makes a "Yes" determination when it proceeds to Step 945, and proceeds to Step 950. After setting the value of the high level flag HIGH to "0" in Step 950, the CPU 51 proceeds to Step 930.

As a result, the CPU 51 makes a "No" determination in Step 930, and proceeds to Step 955 so as to set the motor control signal Vcont to the Low level and supply it to the base terminal of the power transistor Tr. Thus, the drive of the motor MT (and accordingly the drive of the hydraulic pumps HPf and HPr) is stopped. After that, since the value of the high level flag HIGH is maintained at "0," so long as the pump drive-control condition is satisfied, the CPU 51 makes a "Yes" determination in Steps 905 and 910, and then proceeds to Step 915 in order to again perform monitoring for determining whether the motor inter-terminal voltage VMT becomes equal to or less than the latest voltage threshold VMTTH.

When the rotational speed of the motor MT decreases with elapse of time and the motor inter-terminal voltage VMT becomes equal to or less than the latest voltage threshold VMTTH (see, for example, time t3 in FIG. 5), the CPU 51 again makes a "Yes" determination at Step 915, and executes the processing in Steps 920 to 935 in order to again supply the motor control signal Vcont of the High level to the base terminal of the power transistor Tr. As a result, the drive of the motor MT (and accordingly, drive of the hydraulic pumps HPf and HPr) is started.

The CPU 51 repeatedly performs the above-described processing at the predetermined intervals. When satisfying the pump drive-control condition becomes impossible (for example, when the predetermined period of time elapses after the ABS control is ended), the CPU 51 makes a "No" determination when it proceeds to Step 905, and then proceeds to Step 960. The CPU 51 sets the value of the high level flag HIGH to "0" in Step 960, and performs the processing in Steps 930 and 955 to thereby supply the motor control signal Vcont of the Low level to the base terminal of the power transistor Tr.

After that, until the pump drive-control conditions is again satisfied (e.g., until the ABS control is again started), the CPU 51 repeatedly executes the processing in Steps 900, 905, 960, 930, and 955. As a result, the motor control signal Vcont is maintained at the Low level, and the drive of the motor MT (and accordingly, the drive of the hydraulic pumps HPf and HPr) is stopped continuously.

As described above, in the pump drive motor control apparatus according to the embodiment of the present invention, at the start of ABS control, the determination as to whether the present case is the case where excessively abrupt braking is demanded or the case where depressing force control is performed is made on the basis of the master cylinder fluid pressure Pmc at that time and its time-differentiated value DPmc at that time. When the present case is determined to be the case where depressing force control is performed, the voltage threshold VMTTH, which affects the rotational speed of the motor MT, is set to the relatively small value V0 during a period before elapse of the predetermined period of time Tlow after the start of ABS control, the predetermined period of time Tlow corresponding to a short period such that ABS control can continue in the case where depressing force control is performed. After elapse of the predetermined period of time Tlow, the voltage threshold VMTTH is set to the value V1, which is greater than the value V0 and which causes the motor MT to rotate the pumps at a high rotational speed such that the pumps can pump (discharge) brake fluid from the reservoirs RSf and RSr at a flow rate corresponding to the expected maximum flow rate of brake fluid returned to the reservoirs RSf and RSr. Accordingly, when the cause of the start of ABS control is performance of depressing force control by the driver, the operation sound of the motor MT can be reduced in a short period of time immediately after the start of the ABS control, while failure of the ABS control is avoided.

Meanwhile, in the embodiment, when the present case is determined to be the case where excessively abrupt braking is demanded, the voltage threshold VMTTH is maintained at the value V1 immediately after the start of ABS control. Accordingly, when the cause of the start of ABS control is a demand for excessively abrupt braking, failure of the ABS control can be avoided reliably.

The present invention is not limited to the above-described embodiment, and various modifications may be practiced without departing from the scope of the present invention. For example, the pump drive motor control apparatus of the above-described embodiment is configured in such a manner that when the voltage generated by the motor MT (the motor inter-terminal voltage VMT) becomes equal to or less than the predetermined threshold (the voltage threshold VMTTH), supply of electricity to the motor MT is resumed (the motor control signal Vcont is switched from the Low level to the High level), and after passage of the predetermined period of time Thigh (constant time) after that, the supply of electricity to the motor MT is stopped (the motor control signal Vcont is switched from the High level to the Low level). However, the pump drive motor control apparatus may be modified in such a manner that a predetermined period of one cycle for the on-off control is set, and the supply of electricity to the motor MT is resumed when the voltage generated by the motor MT becomes equal to or less than the predetermined threshold and is stopped after every passage of the predetermined period of one cycle. Further, the pump drive motor control apparatus may be configured to change the predetermined period of time Thigh in accordance with elapse of time.

In the above-described embodiment, the predetermined period of time Tlow is set to a predetermined constant time. However, with attention paid to the fact that the flow rate of brake fluid returned to the reservoirs RSf and RSr tends to decrease with the master cylinder fluid pressure Pmc, the pump drive motor control apparatus may be configured to increase the predetermined period of time Tlow as the master cylinder fluid pressure Pmc at the start of ABS control decreases (that is, as the friction coefficient of road surface decreases).

In the above-described embodiment, the value V0 is set to a predetermined constant value. However, with attention paid to the fact that the flow rate of brake fluid returned to the reservoirs RSf and RSr tends to decrease with the master cylinder fluid pressure Pmc, the pump drive motor control apparatus may be configured to decrease the value V0 (accordingly, decrease the rotational speed of the motor MT) as the master cylinder fluid pressure Pmc at the start of ABS control decreases (that is, as the friction coefficient of road surface decreases).

In the above-described embodiment, the case where excessively abrupt braking is demanded is determined to have occurred when the master cylinder fluid pressure Pmc at the start of ABS control is equal to or greater than the predetermined reference master cylinder fluid pressure Pmcref and the time-differentiated value DPmc of the master cylinder liquid pressure at that time is equal to or greater than a predetermined reference master cylinder fluid pressure time-differentiated value DPmcref. However, the pump drive motor control apparatus may be configured such that the case where excessively abrupt braking is demanded is determined to have occurred when the master cylinder fluid pressure Pmc at the start of ABS control is equal to or greater than the predetermined reference master cylinder fluid pressure Pmcref.

In the above-described embodiment, when the case where excessively abrupt braking is demanded is determined to have occurred, the voltage threshold VMTTH is maintained at the value V1 immediately after the start of ABS control. However, the pump drive motor control apparatus may be configured such that when the case where excessively abrupt braking is demanded is determined to have occurred, the voltage threshold VMTTH is maintained at a value greater than the value V1 immediately after the start of ABS control. Alternatively, the pump drive motor control apparatus may be configured such that when the case where excessively abrupt braking is demanded is determined to have occurred, the voltage threshold VMTTH is maintained at a value between the value V0 and the value V1 in a period before elapse of the predetermined period of time Tlow after the start of ABS control, and is set to the value VI after elapse of the predetermined period of time Tlow.

What is claimed is:

1. A pump drive motor control apparatus for controlling a motor for driving a pump, comprising:
    control means for controlling rotational speed of the motor through on-off control performed such that supply of electricity to the motor is resumed on the basis of a result of comparison between a predetermined threshold and a voltage which the motor generates in a state in which supply of electricity to the motor is stopped; and
    threshold setting means for setting the threshold to a first value during a period before elapse of a predetermined period of time after the rotational speed control for the motor has been started by the control means, and for setting the threshold to a second value greater than the first value after elapse of the predetermined period of time.

2. A pump drive motor control apparatus according to claim 1, wherein
    the pump driven by the motor is a hydraulic pump used in a brake fluid pressure controller of a vehicle including at least an antilock brake system, the hydraulic pump pumping brake fluid returned to a reservoir as a result of operation of the brake fluid pressure controller and supplying the pumped brake fluid to a hydraulic circuit of the brake fluid pressure controller; and
    the control means controls the rotational speed of the motor at least during a period in which the brake fluid pressure controller is operating.

3. A pump drive motor control apparatus according to claim 2, further comprising determination means for determining whether a specific operation for demanding excessively abrupt brake is applied to a brake operation member for causing the brake fluid pressure controller to generate brake fluid pressure, wherein
    the threshold setting means is configured such that when the specific operation is determined to have been performed, the threshold is set to a third value, instead of the first or second value, after the start of rotational speed control for the motor, the third value being greater than the first value.

4. A pump drive motor control apparatus according to claim 2, further comprising determination means for determining whether a specific operation for demanding excessively abrupt brake is applied to a brake operation member for causing the brake fluid pressure controller to generate brake fluid pressure, wherein
    the threshold setting means is configured such that only when the specific operation is determined not to have been performed, the threshold is set to the first value during a period before elapse of the predetermined period of time after the start of the rotational speed control, and is set to the second value after elapse of the predetermined period of time.

5. A pump drive motor control apparatus according to claim 3, wherein the determination means comprises brake fluid pressure acquisition means for acquiring brake fluid pressure which is generated within the brake fluid pressure controller in accordance with an operating force applied to the brake operating member, and determines whether the specific operation has been performed on the basis of the acquired brake fluid pressure.

6. A pump drive motor control apparatus according to claim 4, wherein the determination means comprises brake fluid pressure acquisition means for acquiring brake fluid pressure which is generated within the brake fluid pressure controller in accordance with an operating force applied to the brake operating member, and determines whether the specific operation has been performed on the basis of the acquired brake fluid pressure.

7. A pump drive motor control apparatus according to claim 1, wherein the control means is configured to resume supply of electricity to the motor when the voltage which the motor generates in a state in which supply of electricity to the motor is stopped becomes equal to or less than the threshold.

8. A pump drive motor control apparatus according to claim 2, wherein the control means is configured to start the rotational speed control for the motor simultaneously with the start of operation of the brake fluid pressure controller.

9. A pump drive motor control apparatus according to claim 3, wherein the third value is equal to the second value.

10. A pump drive motor control apparatus according to claim 5, wherein the determination means determines whether the specific operation has been performed on the basis of the value of the acquired brake fluid pressure and a value obtained through differentiation of the brake fluid pressure with respect to time.

11. A pump drive motor control apparatus according to claim 6, wherein the determination means determines whether the specific operation has been performed on the basis of the value of the acquired brake fluid pressure and a value obtained through differentiation of the brake fluid pressure with respect to time.

* * * * *